United States Patent [19]

Lyons

[11] 4,090,311

[45] May 23, 1978

[54] METHOD AND APPARATUS FOR TEACHING DYSLEXIC CHILDREN

[76] Inventor: Dorothy Flentie Lyons, 646 Morongo Rd., Palm Springs, Calif. 92262

[21] Appl. No.: 693,319

[22] Filed: Jun. 7, 1976

[51] Int. Cl.² ............................................. G09B 17/00
[52] U.S. Cl. .................................. 35/35 R; 35/35 H; 35/70; 35/71
[58] Field of Search .................. 35/35 R, 35 H, 35 J, 35/36, 37, 69, 70, 71, 18 A, 26, 27, 28; 40/125 E

[56] References Cited

U.S. PATENT DOCUMENTS

| 1,103,369 | 7/1914 | Montessori | 35/35 J |
| 1,946,683 | 2/1934 | Gabriel | 35/26 |
| 1,976,237 | 10/1934 | Logan et al. | 35/26 X |
| 2,454,632 | 11/1948 | Cohn | 35/35 J |
| 2,474,447 | 6/1949 | Wheelock | 35/35 H UX |
| 2,682,118 | 6/1954 | Larsen | 35/35 H |
| 3,170,247 | 2/1965 | Kovacevich | 35/35 J |
| 3,235,975 | 2/1966 | Pierson | 35/30 |
| 3,537,202 | 11/1970 | Braun et al. | 35/35 J X |
| 3,616,551 | 11/1971 | Conrad | 35/35 J |
| 3,654,712 | 4/1972 | Bagdasar | 35/35 H X |
| 3,796,004 | 3/1974 | Auerbach | 35/18 A UX |
| 3,906,644 | 9/1975 | Levinson et al. | 35/35 R |

FOREIGN PATENT DOCUMENTS

| 995,031 | 8/1951 | France | 35/35 J |
| 986,961 | 4/1951 | France | 35/69 |
| 700,095 | 11/1953 | United Kingdom | 35/35 H |

*Primary Examiner*—William H. Grieb
*Attorney, Agent, or Firm*—James E. Brunton

[57] ABSTRACT

A teaching method and device for teaching dyslexic children to form correct mental images of symbols such as letters, numbers and words. In accordance with the method of the invention, the child is encouraged to study a card having imprinted thereon a symbol such as a letter. The child is given an elongated member formed of an easily bendable pliant material and, using the card as a pattern, is encouraged to bend the member into the shape of the letter. In this way, the child's sense of sight is coupled with the important sense of feel to form in the child's mind the correct mental concept of the letter.

5 Claims, 12 Drawing Figures

METHOD AND APPARATUS FOR TEACHING DYSLEXIC CHILDREN

BACKGROUND OF THE INVENTION

1. Field of the Invention

This invention relates generally to a method and apparatus for teaching reading and writing. More particularly, the invention relates to a method and device for teaching children suffering from dyslexia or "word blindness".

2. Discussion of the Prior Art

Approximately one-fourth of all children today enter school with the problem of dyslexia or "word blindness". Dyslexia, as used herein, refers to an inability to deal with and effectively interpret letters, numbers, words and other symbols with the resultant diminished ability to integrate the meaningfulness of written material. Dyslexia, which is also sometimes called "mixed dominance", may be caused by localized malfunction of or injury to the brain, by difficulties in visual perception or motor control, or by various other physical, neurological, or psychoneurological disorders.

Dyslexia is exhibited by children in various ways. Often the dyslexic child can see words, but for him, some words and letter shapes do not have perceptual consistency; that is, they are perceived differently in differing positions. For example, in certain words the child may correctly interpret a "*cr*" sound, while in others, such as "cream", the "*cr*" sound may change to a "*cl*" sound. Frequently, the dyslexic child will mix up letters such as "*b*" and "*d*". Similarly, with words such as "was" and "bid", the child suffering from dyslexia will reverse the letters and read the words as "saw" and "dip". Often, vowels are also incorrectly pronounced, i.e., "bag" "big", etc. As with letters, the dyslexic child will also frequently confuse numbers such as "6" and "9". All of these difficulties make learning to read extremely difficult and often bright children are classified as retarded simply because they cannot see what others see.

In the past, educators and psychologists have suggested various approaches to teaching the dyslexic child. One such approach, known as the "Kinesthetic Method", emphasizes tracing of letters followed by writing without tracing. In accordance with this method, the word is written for the child on a strip of paper, preferably in large, cursive writing. The child traces the word with his finger in contact with the paper, saying each syllable of the word as he traces it. This is repeated until he can reproduce the motions of writing the word from memory. He then is given a paper and pencil and writes the word by reproducting the motions earlier learned. A variation of this approach is described in the Patent to Cohn, No. 2,454,632, wherein the child learns his letters through tracing.

Another approach to teaching the dyslexic child is sometimes called the "phonetic method". This method is based on learning the phonetics represented by letters, sounding them, and blending the sounds together to form words. A variation of this approach is described in the Patent to Conrad, No. 3,616,551.

In addition to the kinesthetic and phonetic approaches, a third basic method is frequently used which emphasizes visual analysis and visualizing. In accordance with this method, words are taught as wholes to be recognized at first on the basis of general shape or configuration. Pictures and illustrations are freely used to introduce words and the child is encouraged to close his eyes and visualize the words, first part by part, and then as a whole. Later he is asked to pronounce the word softly, part by part, while writing it. A variation of this method is exemplified by the Patent to Kovacevich, No. 3,170,247, which relates to instructional reading material in the form of flash cards, reading cards, and the like.

It is, of course, fundamental that perception occurs through our senses and that a concept is formed by organizing perceptions in a meaningful manner. In the previously discussed teaching methods, the senses of sight and hearing were principally used to form the desired concept of a letter or a word. In accordance with the unique method of the present invention, the sense of sight is coupled with the important sense of touch or feel to form the concept of a letter, number, word, or other symbol in the mind of the dyslexic child. Experience has shown that by encouraging the child to "feel" the letter or number, the eye and brain are coordinated in a manner as to overcome many of the learning difficulties experienced by the dyslexic child.

In addition to the patents previously identified, which patents represent the closest art known to applicant and which clearly illustrate the novelty of the present invention, applicant is familiar with the patent to Braun, et al., No. 3,537,202.

SUMMARY OF THE INVENTION

A principal objective of the present invention is to provide a means by which dyslexic children can develop correct images of letters and numbers by encouraging them to correctly create and actually feel physical forms of the letters and numbers.

More particularly, it is an object of the invention to provide a method and device for teaching children with learning difficulties how to read and write by encouraging the children to form and feel the shape of letters so as to effect a coordination of the eyes and the brain and thereby establish a correct mental concept of the various letters of the alphabet.

Another important object of the invention is to provide means by which the dyslexic child can learn simple words by first creating the correct form of the letters of a given word and then using printed cards as guides to physically place the letters into proper order to form the word.

Another object of the invention is to provide teaching means of the aforementioned character which the dyslexic child can be taught to correctly form letters and numbers from elongated smooth rods constructed of a pliant material which, using printed cards as guides, can be bent by the child into the shape of a selected letter or number.

Still another object of the invention is to provide teaching means as described in the preceding paragraph in which certain letters, as, for example, vowels, can be formed from rods of a different color to assist the child in readily distinguishing the particular letters.

A further object of the present invention is to provide teaching means of the class described in which a multiplicity of printed cards are provided to be used by the child as guides in forming letters, words and numbers, said cards having imprinted thereon letters both in manuscript and cursive form; drawings of common objects known to children, such as dogs, cats, cars, etc.; simple words; and numbers.

In summary, these and other objects of the invention are realized by the teaching method and device of the present invention for teaching dyslexic children to form correct mental images of letters, numbers and words whereby the child is exposed to a card selected from sets of cards having imprinted thereon various symbols and then, using the card as a guide, is encouraged to bend one or more elongated pliable members into a shape corresponding to the shape of the symbol. In this way, the child can "feel" the shape of the symbol and thereby form the correct mental image thereof.

Figure 2:
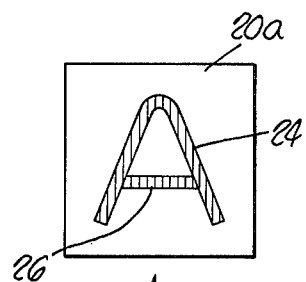
FIGS. 2, 3, 4 and 5 illustrate representative printed cards of a set of 26 cards having imprinted thereon the letters of the alphabet.
Figure 3:
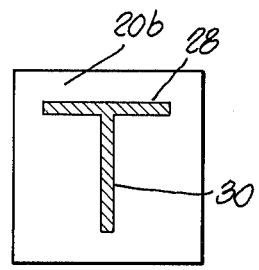

As indicated in FIGS. 2 and 3 by the color shading used, certain of the letters, such as, for example, the vowels, are formed of a different color from letters such as consonants.

Figure 4:
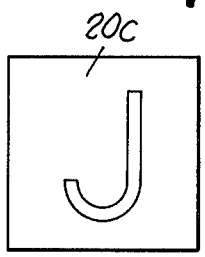
Figure 5:
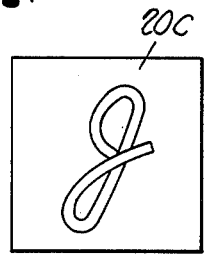

As illustrated by FIGS. 4 and 5, each card has imprinted on one side thereof a letter in manuscript form. On the reverse side of the card, as depicted in FIG. 5, the letter is printed in cursive form.

Figure 6:
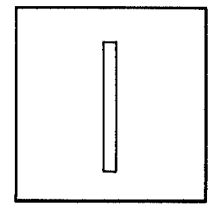
Figure 7:
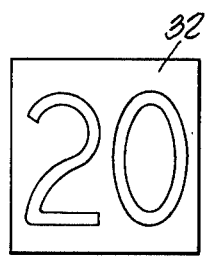

FIGS. 6 and 7 illustrate representative cards from a set of 20 printed cards, each having imprinted thereon the numbers from 1 to 20.

Figure 8:
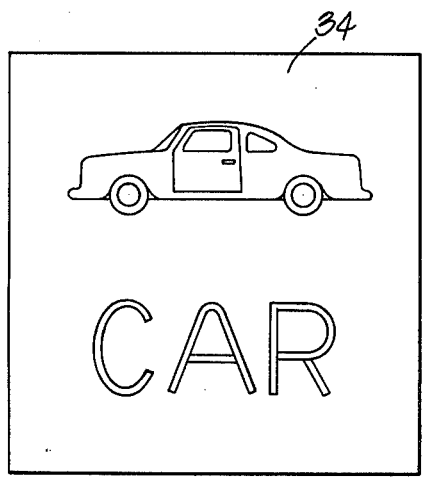
Figure 9:

FIG. 8 is a representative sample of still another set of printed cards, each having imprinted thereon a drawing of an object familiar to a child, such as a car. FIG. 9 illustrates a representative card from another set of cards, each having imprinted thereon words which have been found to be difficult for the dyslexic child to read and pronounce.

Figure 10:
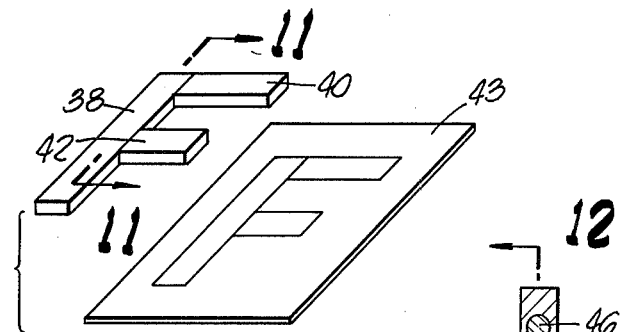
Figure 11:
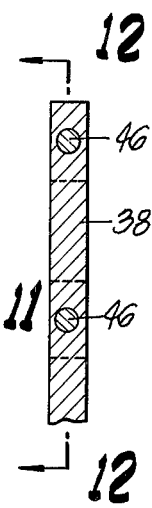
Figure 12:
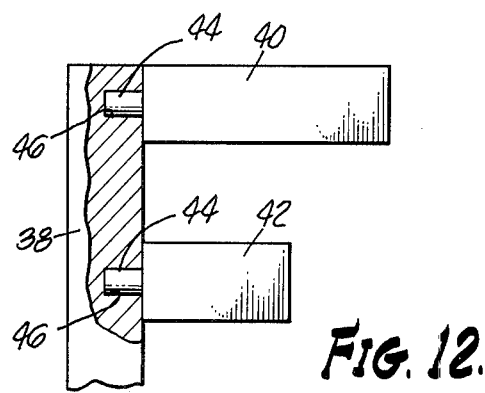

FIGS. 10, 11 and 12 show an alternate form of the elongated members of the invention used by the child to form symbols.

FIG. 10 is a schematic illustration of the method of the invention showing the manner in which the letter "F" is formed using elongated members of an alternate embodiment of the invention.

FIG. 11 is a view taken along lines 11—11 of FIG. 10 illustrating the connecting means of this embodiment of the invention.

FIG. 12 is a view taken along lines 12—12 of FIG. 11 further illustrating the connecting means.

DESCRIPTION OF THE PREFERRED EMBODIMENT

Figure 1:
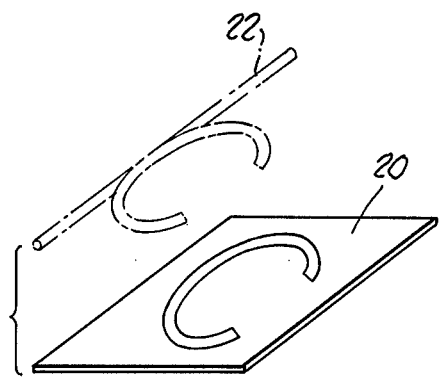
FIG. 1 is a schematic representation illustrating the method of the invention and showing the manner in which elongated readily bendable pliant members are formed into the shape of a symbol such as the letter "C" using a printed card as a guide or a pattern for forming the symbol.

Referring to the drawings and particularly to FIG. 1, there is schematically illustrated the method of the present invention, which method is directed toward teaching a dyslexic or "word blind" child to form correct mental images of symbols such as letters or numbers. In accordance with the invention, the child is exposed to display means, shown here in the form of a card 20, selected from a set of twenty-six cards, each of which includes a substantially planar face having imprinted thereon a symbol in the form of one letter of the alphabet. The cards depicted in FIGS. 2-5 are representative of cards selected from this set with the card 20a shown in FIG. 2 having imprinted thereon the letter "A", the card 20b shown in FIG. 3 having imprinted thereon the letter "T", and the card 20c shown in FIGS. 4 and 5 having depicted thereon the letter "J". It is to be noted that FIG. 5 illustrates the planar reverse side of the card 20c shown in FIG. 4 and depicts the letter "J" in cursive form rather than in manuscript form as shown in FIG. 4. The cards which form the display means of the invention should be large enough so that the symbols imprinted thereon can effectively serve as guides or patterns for the formation of the symbol from pliant rods in a manner presently to be described.

Referring again to FIG. 1, card 20, which has been shown by way of example, is a card having imprinted on the first side thereof the letter "C". The child is directed to observe the form of the letter shown on the card and then is provided with at least one elongated pliant member generally designated by the numeral 22. In the form of the invention shown in FIG. 1, member 22 is in the form of an elongated generally cylindrically shaped rod having a smooth outer surface. The rod may be formed of a wide variety of easily bendable pliant materials such as malleable metal, yieldable plastics, rubber, clay, or the like. Preferably, the elongated members 22 should be relatively rigid and easily formable into various shapes, but returnable to a generally straight configuration. The child is instructed to grasp the elongated member with his fingers and carefully bend it into a shape corresponding to the shape depicted on the card 20, in this instance, the letter "C". After the letter has been correctly formed, as illustrated by the phantom lines of FIG. 1, the child is encouraged to feel with his fingers the shape of the letter. Experience has shown that by encouraging the child to feel the shape of the symbol thus formed, the child's eye and brain are coordinated in a manner as to establish in the child's mind the correct concept of the symbol. Following formation of the elongated rod into the shape of the letter of the alphabet, the card 20 is turned over so that the child can see a representation of the shape of the same letter as it appears in cursive or handwritten form. In this way, the child can form the correct concept of the shape of the letter in both manuscript and cursive form.

After the child has completed his study of the card, another card is selected from the set of alphabet cards and the process is repeated until each card in the set has been exposed and one or more of the pliant members has been formed into the shape of the letter imprinted upon the card. It is to be understood that in forming certain letters, such as the letters "A" and "T", for example, more than one elongated member must be used by the child to form the letter. For example, in forming the letter "A" in the configuration shown in FIG. 2, the child would first bend a rod into the shape of the legs of the "A", here identified by the numeral 24. This done, the child would then form the cross member of the "A" by a shorter straight member 26. Similarly, in forming the letter "T" into the configuration shown in FIG. 3, the child would use two straight members, identified in FIG. 3 by the numerals 28 and 30. It is also to be noted that color may be used to assist the child in distinguishing certain symbols. For example, in the set of cards which comprise the letters of the alphabet, the vowels may be imprinted in one color, such as red, while the consonants are imprinted in another color, such as green. In forming the letter, the child would then be encouraged to select a pliant rod of the same color as the letter being formed as shown on the imprinted card. If, therefore, the child is forming the letter "A", he would be encouraged to select members 24 and 26 which would be red in color.

To teach the dyslexic child numbers, a method similar to that described in the previous paragraphs would be employed. In this case, the child would be exposed to display means in the form of a card selected from a set of cards as depicted in FIGS. 6 and 7, each of which has imprinted thereon a number from 1 to 20. The child would be encouraged to study the card, such as card 32 which, as shown in FIG. 7, has imprinted thereon the numeral "20". The child would then be provided with two elongated pliant members and would be instructed to bend one of the members into the general shape of the number "2" and the other into the general shape of the number "0". The child would be asked to study card 32, to feel the numbers thus formed with his fingers, and to place them in the correct order to form the number "20". The aforementioned steps would be repeated until each card in the set of twenty cards had been exposed and one or more of the pliant members had been formed into the shape of the number or numbers appearing on each card.

When the method of the invention is employed to teach the dyslexic child to spell and to read, the child is first exposed to display means in the form of a card selected from the set of card, each having imprinted thereon a letter of a given monosyllable word. As previously described, the child is then provided with an elongated pliant member and is instructed to bend the member into the shape of the letter of the monosyllable word imprinted on the card. This step is repeated until each card in the set of cards comprising the letters of the word selected has been exposed and the child has formed a pliant member into the shape of each of the letters. Next, the child is exposed to a word card such as, for example, a card 34 as depicted in FIG. 8. In this instance, the set of cards which would have been selected for the formation of the letters would have been a set comprising the letters "C" "A" "R", and the child would have formed each of these letters in accordance with the method herein described. The child would be asked to study card 34 and then to arrange the letters previously formed into the order shown on the card or, in this case, into the word "CAR". In this way, the child would be exposed to the feel of each of the letters forming the word "CAR" and by then placing the letters into the correct order, would generate a "feel" of the word "CAR". It is advantageous in using this method of the invention to have depicted on the word cards or on a separate set of companion cards a drawing of the object identified by the monosyllable word as, for example, a drawing of a car. In this way, the child can associate the word, the feel of the word, and the visual image of the object identified by the word.

Experience has shown that words having certain arrangements of letters provide great difficulty to the dyslexic child. Frequently the dyslexic child will mix up and reverse letters. such as "b" and "d". Similarly, with words such as "was", the child will reverse the letters and read the word as "saw". In other instances, the child may have great difficulty in pronouncing certain words, such as "cream", and may tend to substitute a "cl" sound for a "cr" sound. For this reason, as depicted in FIG. 9 of the drawings, yet another set of cards is provided as a part of the display means of the educational device of the invention. This set includes cards having imprinted thereon words which have proved difficult to the dyslexic child, such as the word "cream" imprinted on card 36, shown in FIG. 9. By encouraging the child to study these word cards and in the manner previously described to form the letters which make up these words from the pliant members, correct mental images can be established in the child's mind. In this way, word reversing tendencies and pronounciation difficulties can often be corrected.

In FIGS. 10–12 there is shown an alternate embodiment of the educational device of the invention. In this form of the invention, the elongated members used to form the shape of the symbols shown on the display means are provided with connecting means for removably interconnecting the members together. Referring particularly to FIG. 10, there is shown three elongated members of this form of the invention, identified respectively by the numerals 38, 40 and 42. These members are also formed of a readily bendable pliant material, but are generally rectangular in cross-section and embody connecting means, one form of which is shown in FIGS. 11 and 12. In this embodiment, the connecting means comprise male extensions 44 formed on one end of members 40 and 42 (FIG. 12). Also forming a part of the connecting means of this form of the invention are female receptacles 46 provided in certain of the elongated members such as, for example, member 38. As illustrated in FIGS. 11 and 12, the male extensions 44 shown here as being generally circular in cross-section, are adapted to be closely received within the female receptacles 46, also shown as being circular in cross-section. Referring again to FIG. 10, it can be seen that with this embodiment of the invention, when the child is provided with a card, such as card 48, having imprinted thereon the letter "F", he can select elongated members, such as members 38, 40 and 42, and removably connect them together to form the shape of the letter "F". In this way, the child can actually handle the letter and feel its shape as an integral unit. By providing elongated members having various arrangements of connecting members, numerous symbols such as letters can be formed by the child in accordance with the method of the invention as previously described.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scppe and spirit of the invention, as set forth in the following claims.

I claim:

1. A method of teaching a dyslexic child to form correct mental images of letters of the alphabet and the numbers from one to twenty, comprising the steps of:
    (a) exposing to the sight of a dyslexic child a card from a set of cards, each having imprinted thereon a letter from the alphabet, said cards being printed with the vowels in a first color and the consonants in a second color;
    (b) providing the child with a plurality of smooth surfaced, elongated, yieldable pliant plastic rod-shaped members, said members being of different colors corresponding to the colors of the letters imprinted on said cards and being relatively rigid, but easily formable into the shapes of the letters and being returnable to a generally straight configuration;

(c) instructing the child to grasp one of said straight members with his fingers and carefully bend said member into the shape of a symbol letter of the same color imprinted on one side of said card;

(d) encouraging the dyslexic child to feel with his fingers the shape of the symbol thus formed;

(e) instructing the dyslexic child to turn said card over and while feeling the symbol which has been formed study the appearance of the symbol as printed on said opposite side of said card; and (f) repeating said aforementioned steps until each card in the set has been exposed and a plastic member has been formed into the shape of the symbol on each said card whereby the dyslexic child can correlate within his mind the visual appearance and "feel" of said symbols.

2. A method as defined in claim 1 including the steps of exposing to the sight of a dyxlexic child a card from a set of cards having imprinted thereon a number from one to twenty and bending one of said members into the shape of a selected number.

3. An educational device for teaching dyslexic children to form correct mental images of letters of the alphabet and numbers from one to twenty, comprising:

(a) a plurality of generally straight elongated members formed of a readily bendable smooth surfaced plastic material of first and second colors, said members being relatively rigid but easily formable into the shape of letters and numbers and being returnable to a generally straight configuration; and (b) a plurality of display cards each including a substantially planar face having imprinted thereon at least one symbol adapted to function as a guide for bending said members into the shape of said symbol, said display means comprising:

(i) a set of twenty-six printed cards, each having a front and back substantially planar surface and each having one of the letters of the alphabet imprinted thereon, said letter being printed in manuscript form on one said planar surface and in cursive form on the opposite said planar surface, said vowels being printed in one color corresponding to said first color of said plastic material and said consonants being printed in another color corresponding to said second color of said plastic material;

(ii) a set of twenty printed cards having imprinted thereon the numbers one to twenty; and (iii) a set of printed cards each having imprinted thereon a monosyllable word, whereby a dyslexic child can learn, numbers and simple words appearing on said printed cards and then, using said cards as guides, physically bend said elongated members into the shape of selected letters or numbers the colors of which correspond to the color of said elongated members thereby teaching the dyslexic child to form, by "feel" the correct mental images of the letters, numbers and words.

4. An educational device as defined in claim 3 in which said elongated members are provided with connecting means for removably interconnecting said members together.

5. An educational device as defined in claim 4 in which said connecting means comprise a male extension formed on at least one of said elongated members and a female receptacle formed on another of said elongated members said female receptacle being adapted to closely receive said male extension whereby said members are releasably interconnected.

* * * * *